(12) United States Patent
Sakaguchi (10) Patent No.: US 6,774,824 B2
(45) Date of Patent: Aug. 10, 2004

(54) ENCODING DEVICE AND METHOD FOR ENCODING DIGITAL IMAGE IMPROVED BY REQUANTIZATION OF A PREDETERMINED SUBBIT PLANE

(75) Inventor: Tomoyuki Sakaguchi, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/616,068

(22) Filed: Jul. 9, 2003

(65) Prior Publication Data

US 2004/0032989 A1 Feb. 19, 2004

(30) Foreign Application Priority Data

Jul. 10, 2002 (JP) .................................... 2002-200708

(51) Int. Cl.$^7$ ................................................ H03M 7/40
(52) U.S. Cl. .......................... 341/67; 341/50; 341/70; 382/239; 382/251; 382/232; 382/203; 709/203; 709/217
(58) Field of Search ................... 341/50, 64; 382/239, 382/251, 232, 252; 709/203, 217

(56) References Cited

U.S. PATENT DOCUMENTS

| | | | | |
|---|---|---|---|---|
| 5,430,556 A | * | 7/1995 | Ito ............................. | 382/251 |
| 5,434,567 A | * | 7/1995 | Mack et al. .................. | 341/50 |
| 5,568,598 A | * | 10/1996 | Mack et al. ................. | 382/302 |
| 5,629,778 A | * | 5/1997 | Reuman ...................... | 382/252 |
| 5,631,644 A | * | 5/1997 | Katata et al. ................ | 341/67 |
| 5,905,815 A | * | 5/1999 | Mack et al. ................. | 382/250 |
| 5,986,710 A | * | 11/1999 | Kim et al. ................ | 375/240.2 |
| 6,081,208 A | * | 6/2000 | Kikuchi et al. ................ | 341/50 |
| 6,314,452 B1 | * | 11/2001 | Dekel et al. ................. | 709/203 |
| 6,356,663 B1 | * | 3/2002 | Korta et al. ................. | 382/239 |
| 6,453,072 B1 | * | 9/2002 | Hatakenaka ................. | 382/232 |
| 6,545,618 B2 | * | 4/2003 | Yip ............................. | 341/51 |
| 6,600,837 B1 | * | 7/2003 | Shimura et al. ............. | 382/239 |
| 6,671,411 B1 | * | 12/2003 | Satoh .......................... | 341/67 |
| 6,674,376 B1 | * | 1/2004 | Nishimura .................... | 341/67 |
| 6,696,993 B2 | * | 2/2004 | Karczewicz .................. | 341/67 |

FOREIGN PATENT DOCUMENTS

JP 2000-197050 7/2000

* cited by examiner

Primary Examiner—Michael Tokar
Assistant Examiner—Lam T. Mai
(74) Attorney, Agent, or Firm—Katten Muchin Zavis Rosenman

(57) ABSTRACT

There is provided a digital image encoding device which can enhance image compression performance while maintaining an image quality. When coefficient bits are decomposed/aligned in four encoded paths for each context by a procedure called coefficient bit modeling of a JPEG 2000 encoding system, if an appearance frequency of "1" is low in subbit plane coefficients of a clean-up path of a low-order bit plane n (bit plane n is lower in order than bit plane np represented by threshold value np), coefficients of subbit planes of this clean-up path are all reset to "0." Thus, a run length used when a symbol and a context are generated is made longer and, as a result, the amount of codes after arithmetic encoding at a subsequent stage is reduced while an image quality deterioration is suppressed.

18 Claims, 10 Drawing Sheets

ENCODING DEVICE AND METHOD FOR ENCODING DIGITAL IMAGE IMPROVED BY REQUANTIZATION OF A PREDETERMINED SUBBIT PLANE

BACKGROUND OF THE INVENTION

1. Field of the Invention

The present invention relates to a device and a method for encoding a digital image as well as a program, and more particularly, to a device and a method for encoding a digital image as well as a program in which a joint photographic coding experts group (JPEG) 2000 (ISO/IEC 15444-1) system is used.

2. Description of the Related Art

In JPEG 2000 (ISO/IEC 15444-1) which is an international standard of the ISO/IEC, an image quality of a low bit rate has been improved as compared with conventional JPEG (ISO/IEC 10918). In the JPEG 2000, image compression which permits image distortion is possible, and distortion is added to an image while an image quality is adjusted on an encoder side to enable effective compression thereof.

However, in terms of only compression performance, no such big improvements can be seen for the JPEG.

On the other hand, an example of the conventional art of this kind is disclosed in JP-A-2000-197050. According to this disclosed technology, a face area recognizing section extracts a face area from an image based on a variable coefficient obtained by wavelet conversion, a quantizing section executes a quantization process for an entered variable coefficient while switching a quantization coefficient used for a quantization process outside and inside the extracted face area, and high-performance image quantization which maintains a high image quality is accordingly achieved by a simple process.

However, this disclosed technology concerns the wavelet conversion and the quantization process, but not an entropy encoding process of a next stage.

SUMMARY OF THE INVENTION

Thus, an object of the present invention is to provide a device and a method for encoding a digital image, and a program, where in the JPEG 2000 the entropy encoding process is improved to enhance image compression performance while maintaining an image quality.

In order to achieve the object, there is provided a digital image encoding device of the present invention comprises: conversion means for converting digital image data into a coefficient based on a spatial frequency; quantization means for quantizing the coefficient obtained by the conversion means; and coefficient bit modeling means for carrying out coefficient bit modeling by using the coefficient quantized by the quantization means. The digital image data is divided into a plurality of subbands in the conversion means. The coefficient bit modeling means includes: code block division means for dividing each of the subbands into a plurality of code blocks; bit plane decomposition means for decomposing each of coefficients of the code blocks obtained by the code block division means into a plurality of bit planes for each bit weight; subbit plane decomposition means for decomposing each of the bit planes obtained by the bit plane decomposition means into a plurality of subbit planes based on usefulness; and predetermined data generation means for generating predetermined data in accordance with the subbit planes obtained by the subbit plane decomposition means.

The coefficient bit modeling means includes requantization means for requantizing a predetermined subbit plane among the subbit planes obtained by the subbit plane decomposition means and passing data after the requantization to the predetermined data generation means.

In order to achieve the object, there is provided a digital image encoding method of the present invention comprises: conversion step of converting digital image data into a coefficient based on a spatial frequency; quantization step of quantizing the coefficient obtained by the conversion step; and coefficient bit modeling step of carrying out coefficient bit modeling by using the coefficient quantized by the quantization step. The digital image data is divided into a plurality of subbands in the conversion step. The coefficient bit modeling step includes: code block division step of dividing each of the subbands into a plurality of code blocks; bit plane decomposition step of decomposing each of coefficients of the code blocks obtained by the code block division means into a plurality of bit planes for each bit weight; subbit plane decomposition step of decomposing each of the bit planes obtained by the bit plane decomposition step into a plurality of subbit planes based on usefulness; and predetermined data generation step of generating predetermined data in accordance with the subbit planes obtained by the subbit plane decomposition step. The coefficient bit modeling step includes requantization step of requantizing a predetermined subbit plane among the subbit planes obtained by the subbit plane decomposition step and passing data after the requantization to the predetermined data generation step.

In order to achieve the object, there is provided a program for causing a computer to perform a digital image encoding method of the present invention. In the program, the method comprises: conversion step of converting digital image data into a coefficient based on a spatial frequency; quantization step of quantizing the coefficient obtained by the conversion step; and coefficient bit modeling step of carrying out coefficient bit modeling by using the coefficient quantized by the quantization step. The digital image data is divided into a plurality of subbands in the conversion step. The coefficient bit modeling step includes: code block division step of dividing each of the subbands into a plurality of code blocks; bit plane decomposition step of decomposing each of coefficients of the code blocks obtained by the code block division means into a plurality of bit planes for each bit weight; subbit plane decomposition step of decomposing each of the bit planes obtained by the bit plane decomposition step into a plurality of subbit planes based on usefulness; and predetermined data generation step of generating predetermined data in accordance with the subbit planes obtained by the subbit plane decomposition step. The coefficient bit modeling step includes requantization step of requantizing a predetermined subbit plane among the subbit planes obtained by the subbit plane decomposition step and passing data after the requantization to the predetermined data generation step.

DESCRIPTION OF THE PREFERRED EMBODIMENTS

Figure 1:
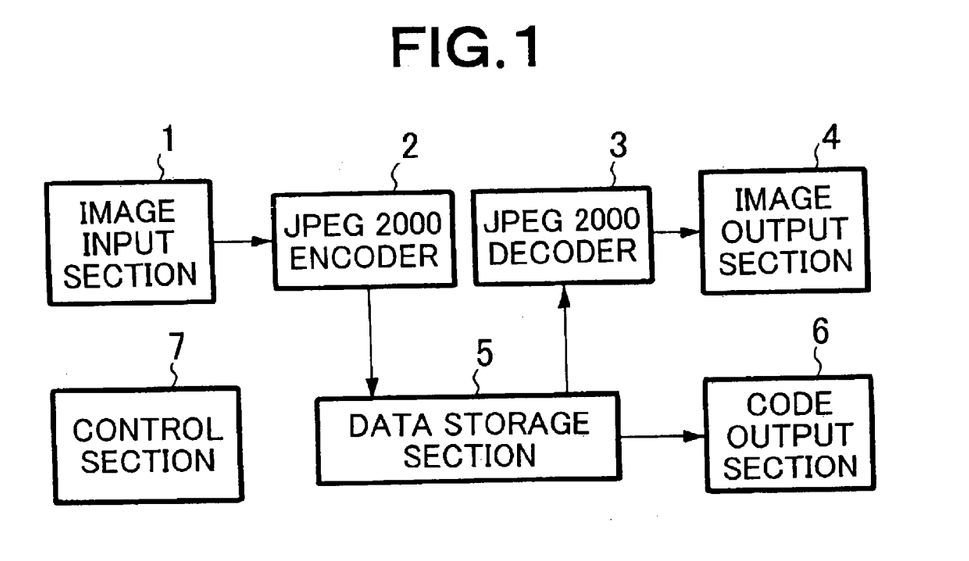
FIG. 1 is a constitutional view of a digital image encoding device according to a first embodiment of the present invention.

Next, the preferred embodiments of the present invention will be described with reference to the accompanying drawings. First, a first embodiment will be described. FIG. 1 is a constitutional view of a digital image encoding device according to the first embodiment of the present invention. Referring to FIG. 1, the digital image encoding device of the present invention is constituted by including an image input section 1 for taking in an image, a JPEG 2000 encoder 2 for subjecting the entered image to JPEG 2000 compression, a data storage section 5 for storing compressed data, a JPEG 2000 decoder 3 for decoding the stored data, an image output section 4 for outputting the decoded image data, a code output section 6 for outputting the stored encoded data, and a control section 7 for carrying out overall control.

Next, an operation of the digital image encoding device will be described. Digital image is entered to the image input section 1 from a still image input device such as an image scanner or a digital camera, or a memory or the like where the image data is stored. This entered image is subjected to JPEG 2000 compression at the JPEG 2000 encoder 2.

The JPEG 2000 encoder 2 can be constituted of software, hardware such as an LSI, or a combination of software and hardware. In the description of the embodiment, it is assumed that the encoder is realized by software.

Figure 2:
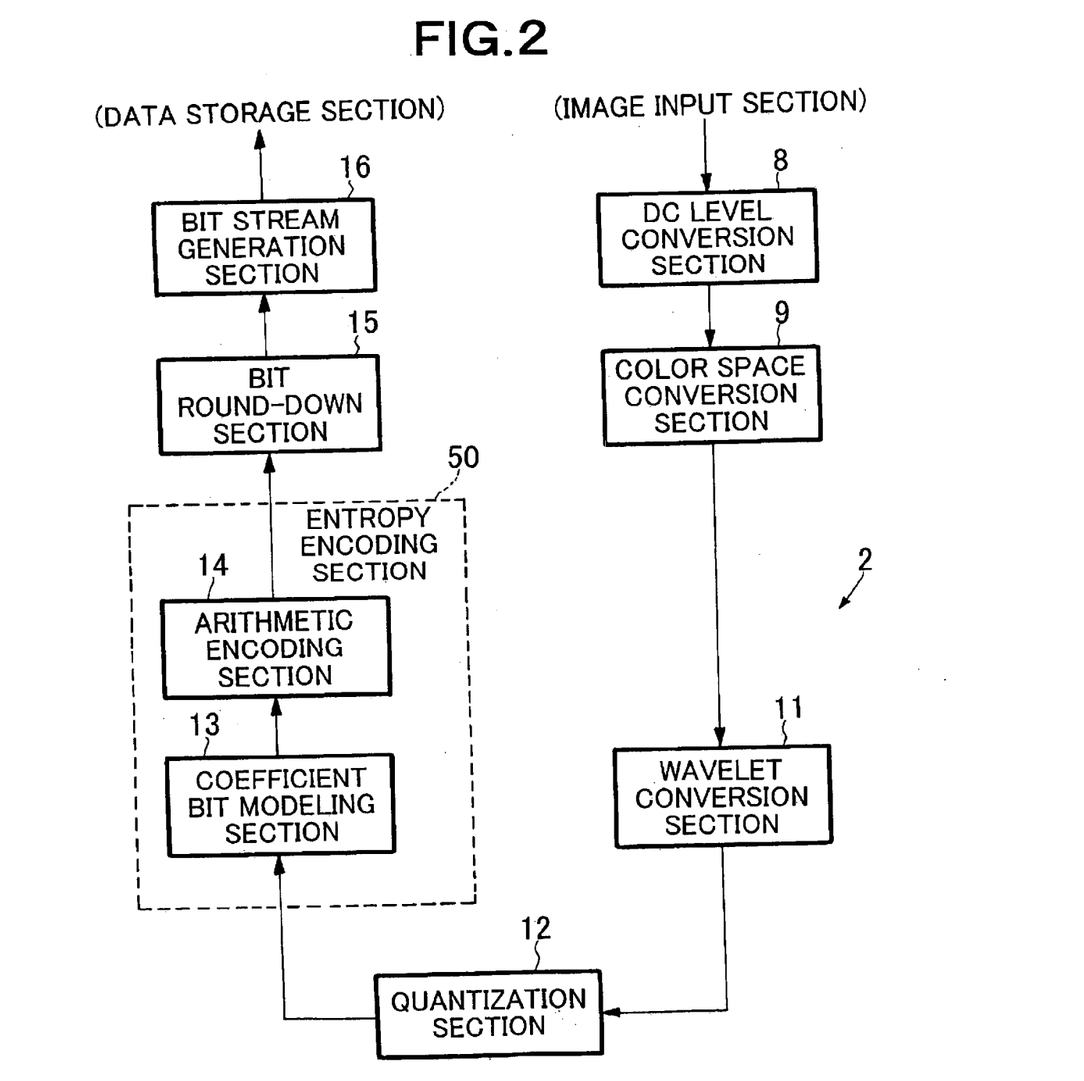
FIG. 2 is a constitutional view of the digital image encoding device of the first embodiment of the present invention.

FIG. 2 is a constitutional view of the JPEG 2000 encoder 2 of the present invention. Referring to FIG. 2, the JPEG 2000 encoder 2 is constituted by including a DC level conversion section 8, a color space conversion section 9, a wavelet conversion section 11, a quantization section 12, an entropy encoding section 50 which comprises a coefficient bit modeling section 13 and an arithmetic encoding section 14, a bit round-down section 15 and a bit stream generation section 16.

At the JPEG 2000 encoder 2, first, DC level conversion and color spade conversion into a defined color space are carried out for an entered image by the DC level conversion section 8 and the color space conversion section 9. Then, at the wavelet conversion section 11, the converted image is subjected to wavelet conversion into a numeral, and a converted coefficient is quantized by the quantization section 12. By using the quantized coefficient, the coefficient bit modeling section 13 generates a symbol D encoded at the arithmetic encoding section 4 14 of next processing and a context CX used therefor.

Figure 3:
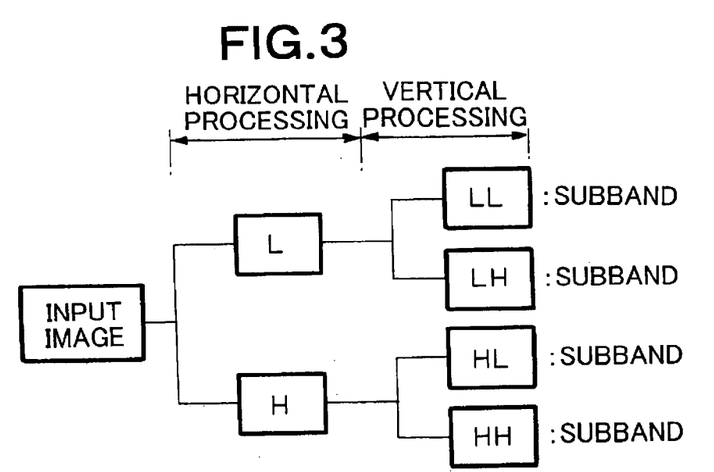
FIG. 3 is a conceptual view of wavelet conversion.

Now, the wavelet conversion at the wavelet conversion section 11 will be briefly described. FIG. 3 is a conceptual view of the wavelet conversion. As shown in the drawing, the entered image is subjected to horizontal processing to be divided into two, i.e., a high frequency band (H: high) and a lower frequency band (L: low). Then, each of the divided images is subjected to vertical processing to be divided into two, i.e., a high frequency band and a lower frequency band. Accordingly, the entered image is divided into four, i.e., a band HH of a highest frequency, a band HL of a next highest frequency HL, a band LH of a frequency high next to the HL, and a band of a frequency high next to the LH: the lowest frequency band LL. This process is called 1 stage decomposition. Each of these bands HH, HL, LH, LL is referred to as a "subband", hereinafter.

The image LL of the lowest band has much energy compared with the other bands to maintain an image quality closest to that of an original image. In the JPEG 2000, further division of the image LL of the lowest band is continued. In the JPEG 2000, 5 stage decomposition is a standard.

Figure 11:
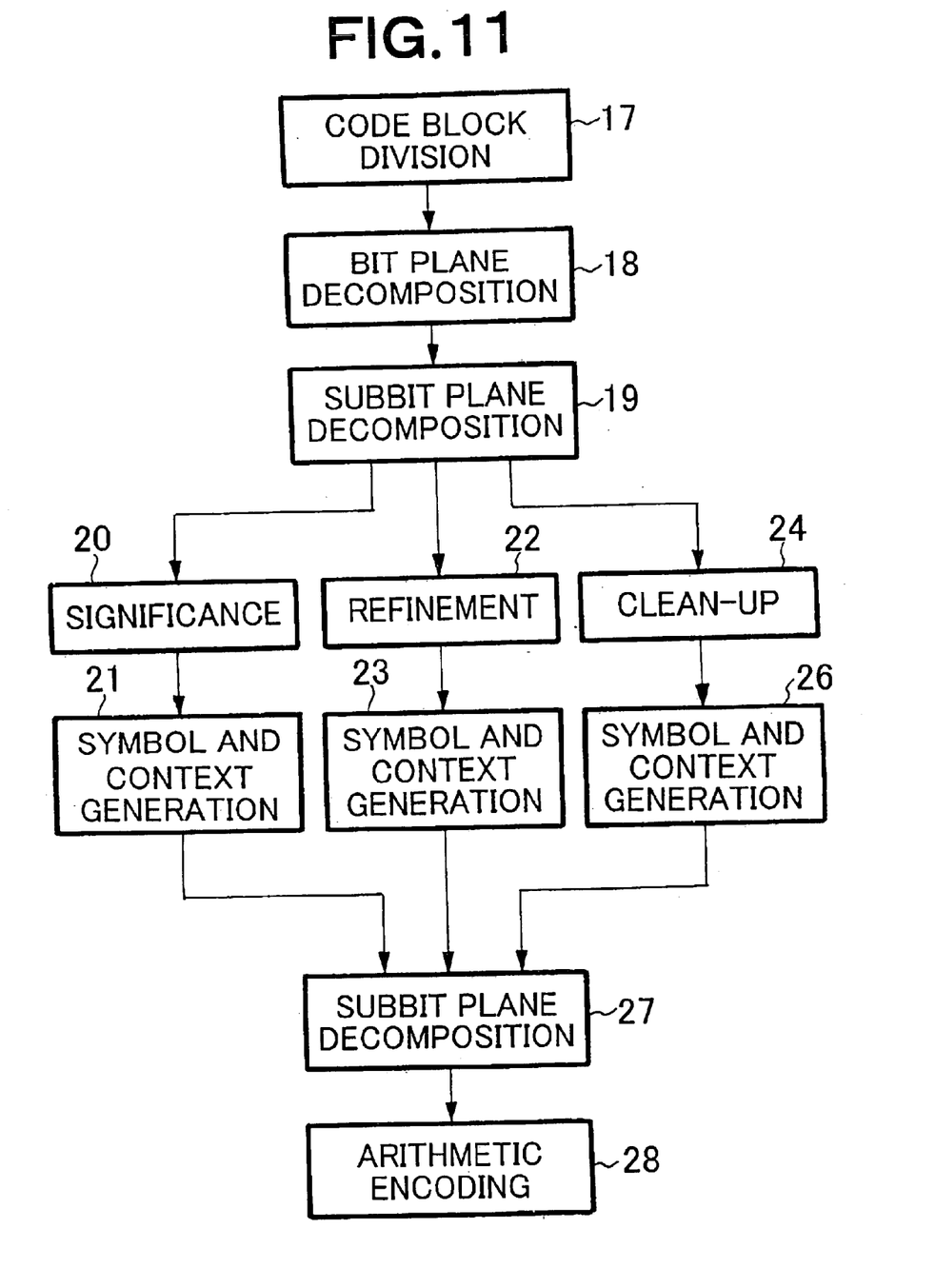
FIG. 11 is a flowchart showing an example of a process of a coefficient bit modeling section 13 in a conventional JPEG 2000 encoder.

Next, a process of the coefficient bit modeling section 13 in the conventional JPEG 2000 encoder will be descried in outline. FIG. 11 is a flowchart showing an example of the process of the coefficient bit modeling section 13 in the conventional JPEG 2000 encoder. Referring to FIG. 11, the process of the coefficient bit modeling section 13 comprises a code block division process 17 for dividing the subbands HH to LL into rectangular areas, a bit plane decomposition process 18 for decomposing a coefficient for each bit weight, a subbit plane decomposition process 19 for decomposing the decomposed bit plane into subbit planes of paths of significance 20, refinement 22 and clean-up 24 based on usefulness, context CX and symbol D generation processes 21, 23, 26 for generating a context CX and a symbol D in accordance with the subbit plane of each path, a subbit plane alignment process 27 for realigning the generated context CX and symbol D, and an arithmetic encoding process 28 for compressing the aligned context CX and symbol D.

Figure 4:
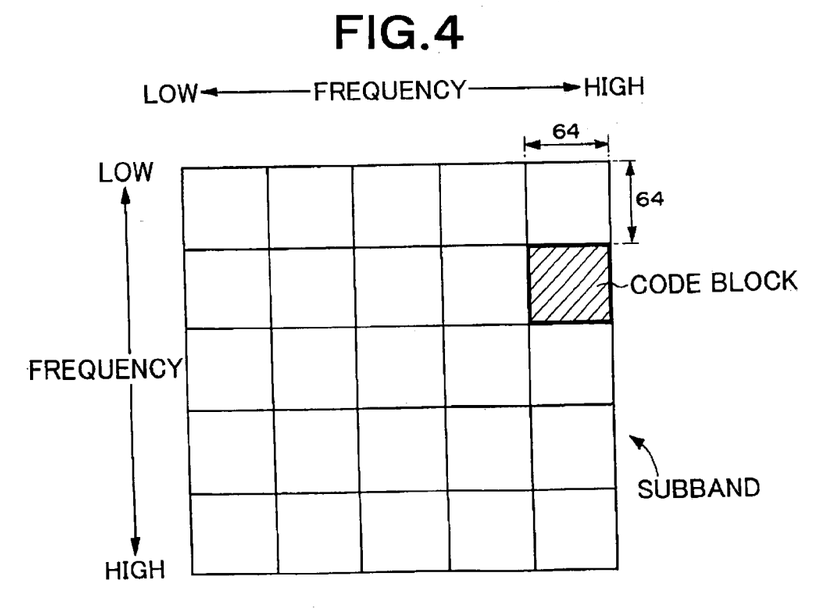
FIG. 4 is a conceptual view of code block division.

Now, the code block division and the bit plane will be briefly described. FIG. 4 is a conceptual view of the code block division. As shown in the drawing, the coefficient entered to the coefficient bit modeling section 13 is divided into rectangular areas for each of the subbands HH to LL. At the coefficient bit modeling section 13, a process thereafter is independently carried out by using this code block as a unit. The drawing shows code block division of a size of 64×64 as an example.

Figure 5:
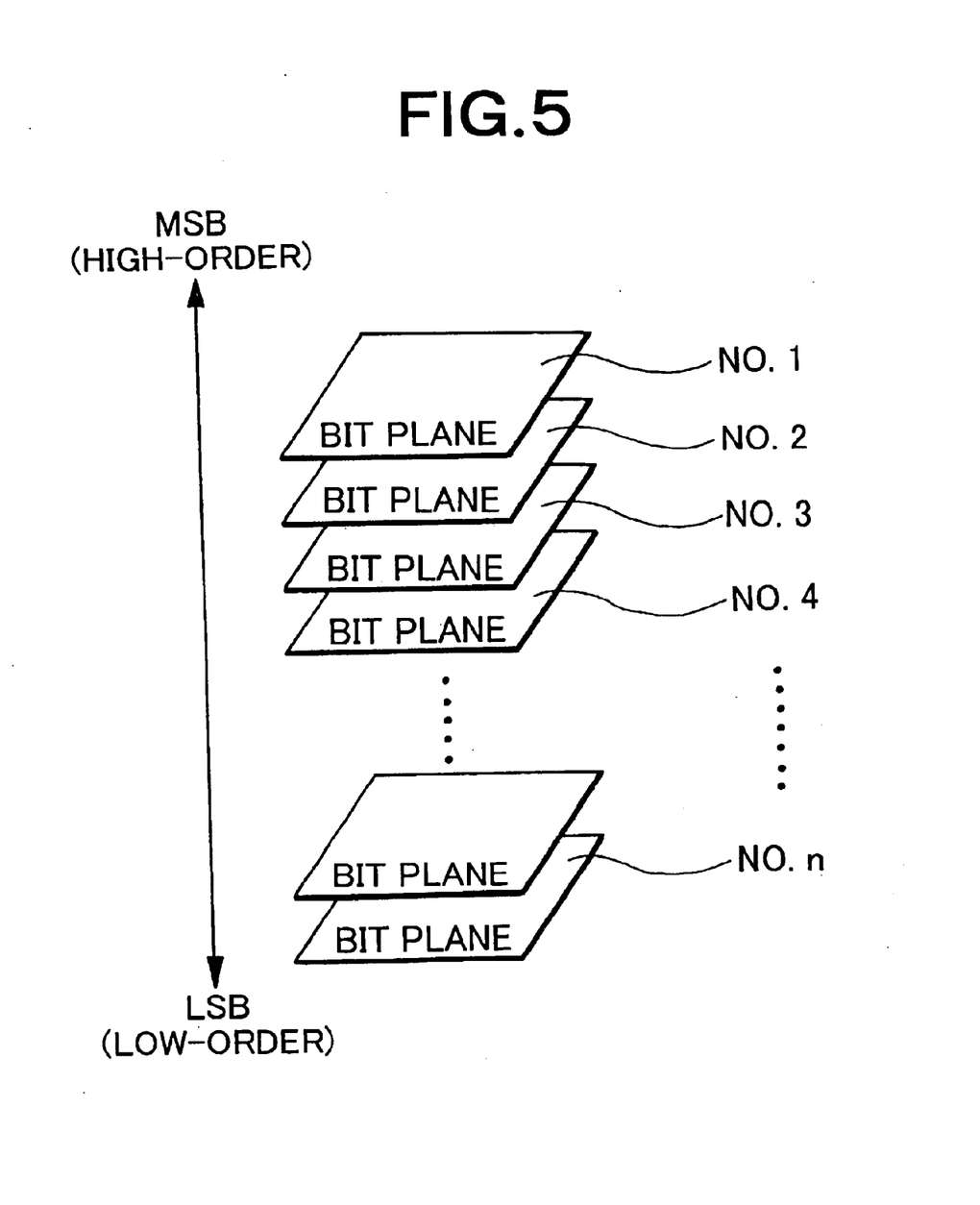
FIG. 5 is a conceptual view of a bit plane.

FIG. 5 is a conceptual view of a bit plane. As shown in the drawing, each code block is decomposed into a plurality of bit planes. The plurality of bit planes are arranged by setting a least significant bit (LSB) direction to be low-order and a most significant bit (MSB) direction to be high-order. Numbers 1, 2, 3, 4, n (n is an integer) are given to the bit planes from a highest order plane in order.

It is assumed that the bit plane No. 1 represents a bit plane of the MSB side of heaviest weight, and the No. n represents a bit plane of the LSB side of lightest weight.

Figure 6:
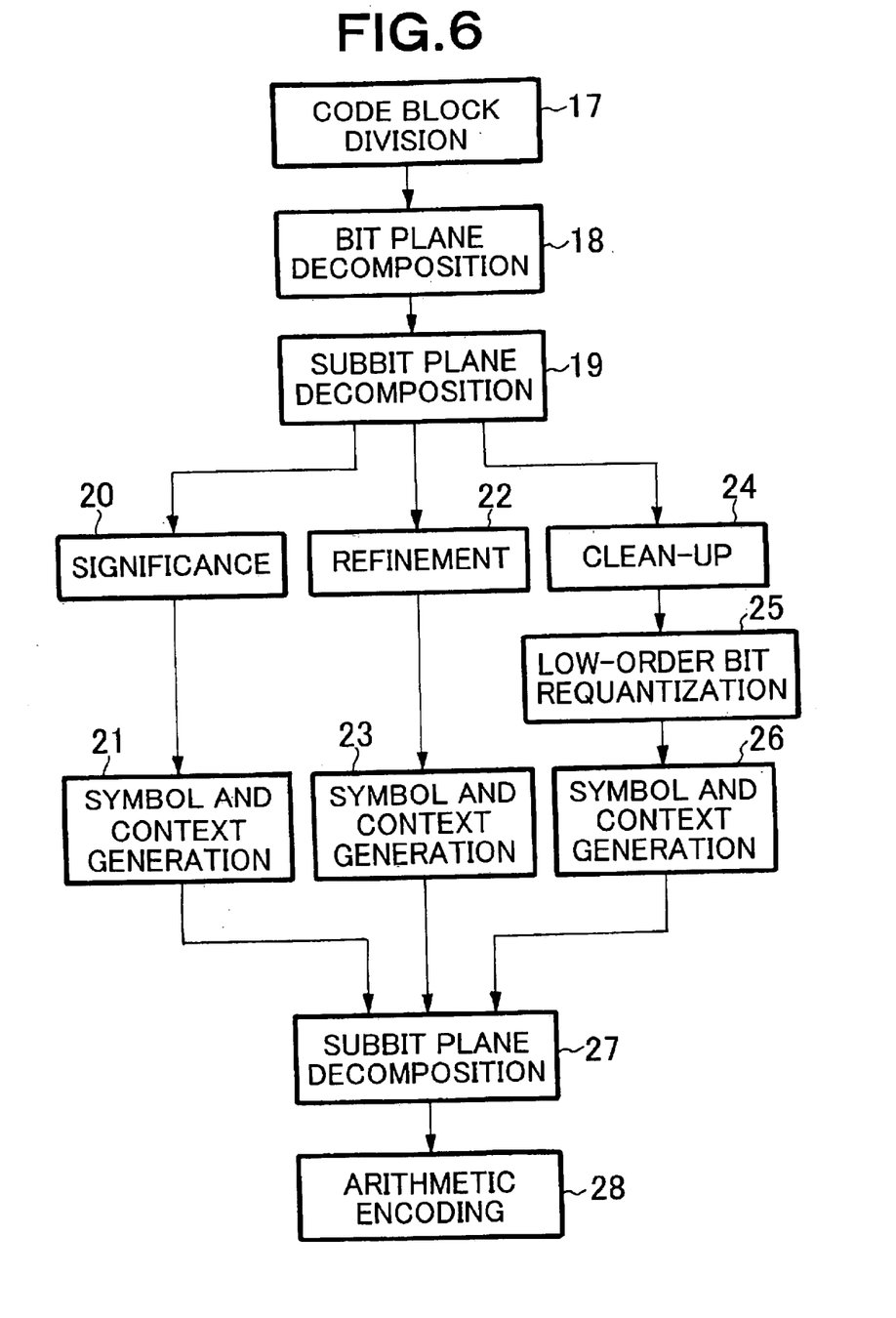
FIG. 6 is a flowchart showing an example of a process of a coefficient bit modeling section 13 in a JPEG 2000 encoder of the present invention.

Next, description will be made of the process of the coefficient bit modeling section 13 in the JPEG 2000 encoder of the present invention. FIG. 6 is a flowchart showing an example of the process of the coefficient bit modeling section 13 in the JPEG 2000 encoder of the present invention. Processes similar to those described above with reference to FIG. 11 are denoted by similar numbers, and description thereof will be omitted.

In the process of the coefficient bit modeling section 13, in the case of a clean-up coding process 24 among three encoding processes (significance coding, magnitude refinement coding, clean-up coding) based on selected process paths, a low-order bit requantization process 25 is carried out before a process 26 of generating a symbol D and a context CX.

The requantization process 25 is limited to the clean-up coding because an appearance probability of "0" is not high in the first place in other process paths and, thus, even if such a requantization process is carried out, not only an effect is small but also an influence on an image quality is large.

Figure 7:
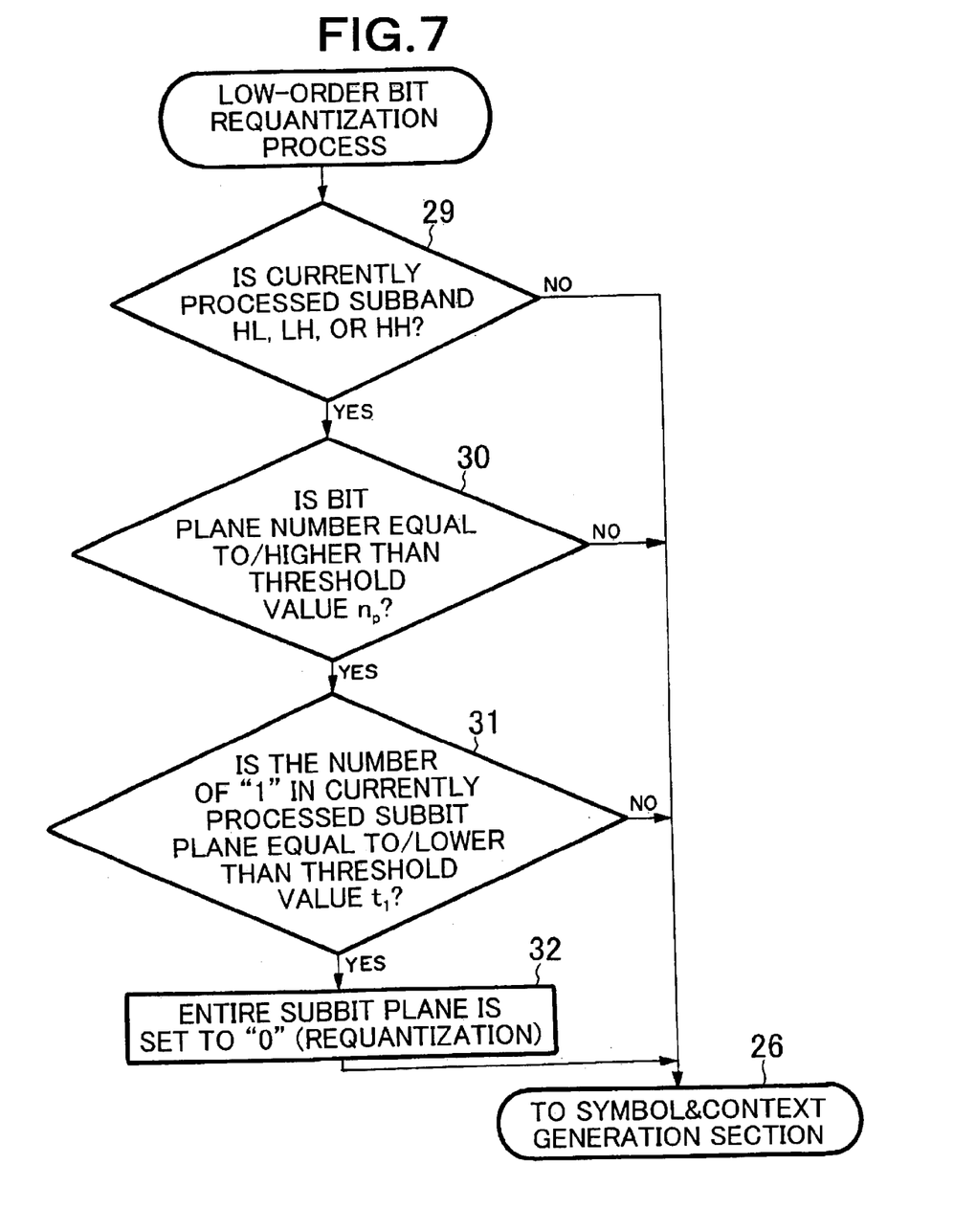
FIG. 7 is a flowchart showing an example of a low-order bit requantization process according to the first embodiment.

Next, the low-order bit requantization process will be described. FIG. 7 is a flowchart showing an example of the low-order bit requantization process of the first embodiment. The requantization process is carried out only when the following conditions (conditions 1 to 3) are satisfied. (Condition 1) A currently processed subband is one of HL, LH, HH (Yes in process 29). If the currently processed subband is LL (No in process 29), the symbol and context regeneration 26 is carried out without executing a quantization process. This is because in the subband LL, a low-pass filter is set in both horizontal and vertical directions, and an influence of the requantization process on an image quality appearance is large. (Condition 2) A currently processed bit plane No. n is equal to/higher than a threshold value np (i.e., currently processed bit plane is a bit of the LSB side more than the bit plane np) (Yes in process 30).

If the currently processed bit plane No. n is not equal to/higher than the threshold value np (No in process 30), the symbol and context generation 26 is carried out without executing a requantization process. This is because if a requantization process is carried out on the high-order (MSB side) bit plane, its influence on an image quality appearance is large.

(Condition 3) The number of "1" in a currently processed subbit plane is equal to or lower than a threshold value t1 (Yes in process 31).

Furthermore, if the number of "1" in the currently processed subbit is not equal to or lower than the threshold value t1 (No in process 31), the symbol and context generation 26 is carried out without executing a requantization process.

If the above conditions 1 to 3 are satisfied, a process of resetting all the current subbit planes n to "0" (requantization process 32) is carried out. In this case, the threshold values np, t1 may be fixed. However, by enabling selection of the threshold values for each subband and in accordance with a wavelet decomposition level, it is possible to adjust an image quality and a compression rate minutely.

After the execution of the requantization process 32, clean-up coding is carried out for coefficients of four elements to be processed all at once as recommended. Then, the symbol D and context CX generation 26 and a subbit plane alignment process 27 are carried out. In this case, encoding is carried out in an arithmetic encoding process 28 by using the generated symbol D and context CX.

Lastly, the data compressed in the aforementioned manner is outputted from the JPEG 2000 encoder 2 by optionally rearraying the order of the encoded data by a system defined in accordance with recommendation at the bit round-down section 15 and the bit stream generation section 16 of FIG. 2.

The image compressed by the JPEG 2000 encoder of FIG. 2 is stored in the data storage section 5 such as a memory or a hard disk of FIG. 1. If it is outputted as an image from the digital encoding device, the stored JPEG 2000 encoded data is decoded by the JPEG 2000 decoder 3, and outputted from the image output section 4 to a device such as a printer or a display. For communications through Internet or a facsimile, and an apparatus or a device having a JPEG 2000 decoder itself, the encoded data is outputted from the code output section 6.

Here, the decoder 3 only decodes the encoded data in accordance with a using scene of the image data along a recommendation report, the present invention requires no special processes of the decoder 3, and decoding can be carried out by a general JPEG 2000 decoder.

The embodiment has been described by way of the digital image encoding device. However, it can be realized as a digital image encoding application or a digital image compression function in an application by software.

In the requantization process of the first embodiment, the run length in the clean-up coding process carried out in the coefficient bit modeling of the JPEG 2000 encoding process becomes maximum in the relevant subbit plane (since this process in the JPEG 2000 is carried out by 4 pixel units, a maximum run length becomes 4), and a symbol and a context indicating the maximum run length continuously appear. Thus, a high compression rate can be obtained during arithmetic encoding at a subsequent stage.

Furthermore, since execution of requantization is selectively decided based on a target subband, a bit plane number or the like during the requantization process, a visual image deterioration can be limited small compared with the increase of a compression rate.

Figure 8:
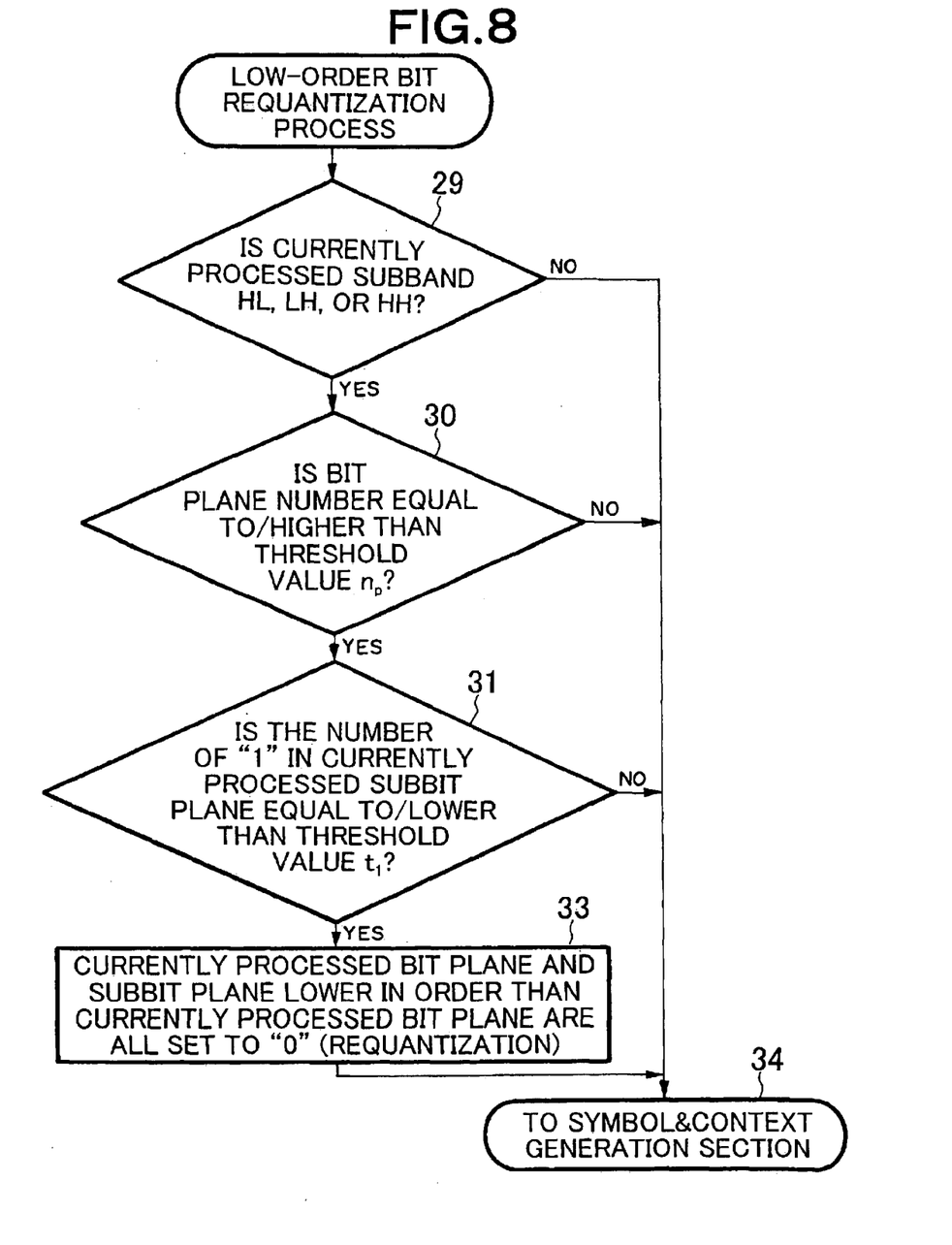
FIG. 8 is a flowchart showing an example of a low-order bit requantization process according to a second embodiment.

Next, a second embodiment will be described. FIG. 8 is a flowchart showing an example of a low-order bit requantization process according to the second embodiment. Processes similar to those described above with reference to FIG. 7 are denoted by similar numbers, and description thereof will be omitted.

Referring to FIG. 8, while all the currently processed subbit planes are set to "0" in the low-order bit requantization process of the first embodiment (see process 32 of FIG. 7), in the second embodiment, the constitution is changed in such a manner that not only all currently processed subbit planes are set to "0" but also all subbit planes lower in order than the currently processed subbit planes are set to "0" (see process 33 of FIG. 8).

According to the second embodiment, if conditions (processes 29 to 31) similar to those of the first embodiment are satisfied, a process is carried out to reset all of a currently processed subbit plane n and subbit planes lower in order than the subbit plane n to "0" (requantization process 33). In this case, threshold values np, t1 may be fixed. However, by enabling selection of threshold values for each subband and in accordance with a wavelet decomposition level, it is possible to adjust an image quality and a compression rate minutely.

By such a constitution, if a round-down process is carried out to the same amount of codes at the bit round-down section 15, a coefficient of a small value in a clean-up coding state in the currently processed bit plane is ignored, and coefficients of large values already in significant coding and refinement coding states can be encoded more accurately.

That is, by the constitution of the second embodiment of the present invention, when the JPEG 2000 encoding process is carried out, from the clean-up coding process path, the amount of output codes of arithmetic encoding process corresponding to the subbit planes lower in order than the requantized subbit plane is greatly reduced. As a result, it is possible to obtain a compression rate higher than that of the first embodiment.

For the image compressed in the above manner, as in the case of the first embodiment, the decoder only decodes the encoded data in accordance with a using scene of image data along the recommendation report, the invention requires no special processes of the decoder, and decoding can be carried out by a general JPEG 2000 decoder.

Figure 9:
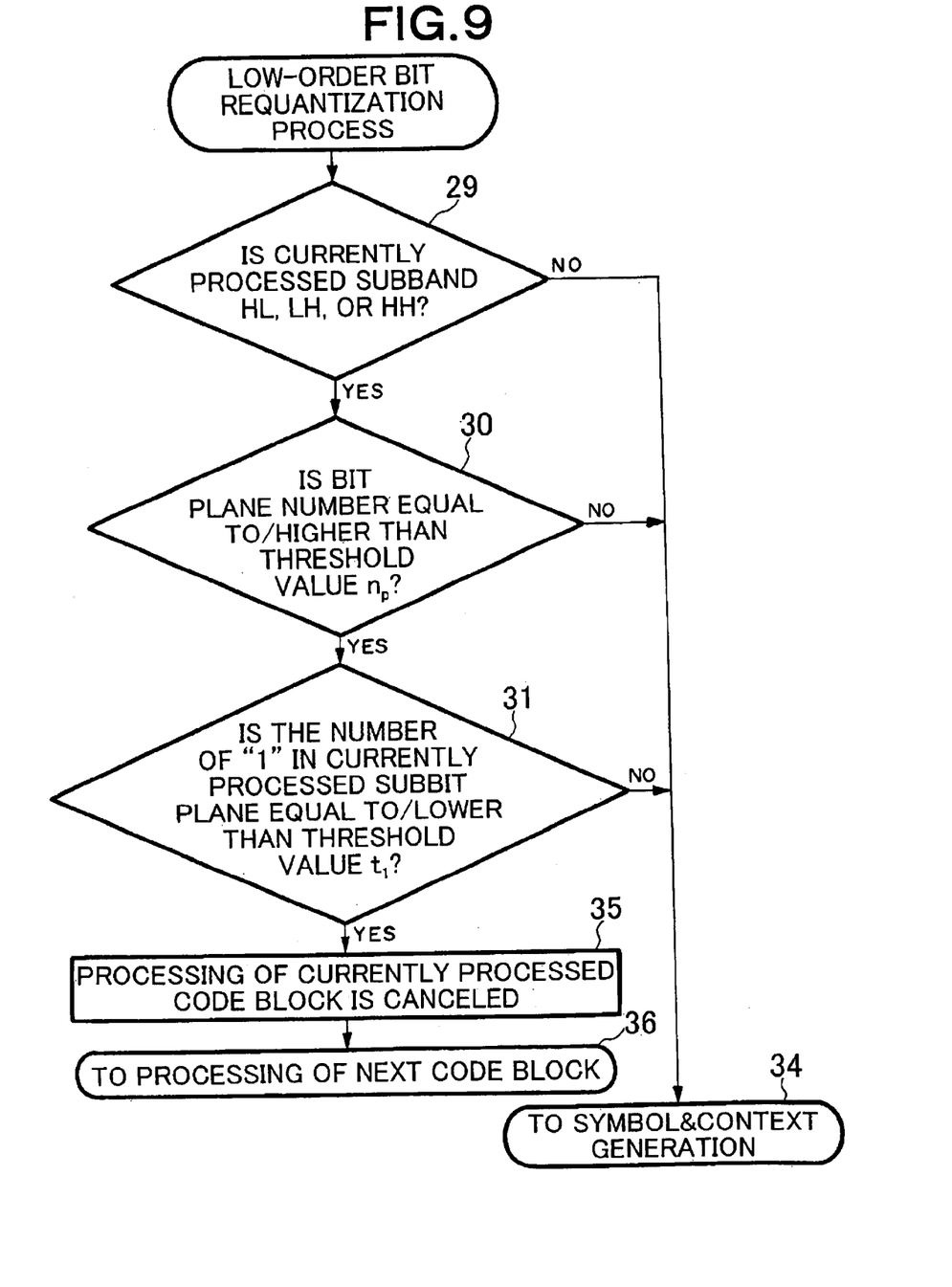
FIG. 9 is a flowchart showing a low-order bit requantization process according to a third embodiment.

Next, a third embodiment will be described. FIG. 9 is a flowchart showing an example of a low-order bit requantization process according to the third embodiment. Processes similar to those described above with reference to FIG. 7 are denoted by similar numbers, and description thereof will be omitted.

Referring to FIG. 9, while all the currently processed subbit planes are set to "0" in the low-order bit requantization process of the first embodiment (see process 32 of FIG. 7), in the third embodiment, the constitution is changed in such a manner that processing of currently processed code block is canceled (see process 35 of FIG. 9) to carry out processing of a next code block (see process 36 of FIG. 9).

In this case, threshold values np, t1 may be fixed.

However, by enabling selection of threshold values for each subband and in accordance with a wavelet decomposition level, it is possible to adjust an image quality and a compression rate minutely.

By the constitution of the third embodiment of the present invention, since bit planes (including all the subbit planes) lower in order than the currently processed code block bit planes are not generated as codes, the amount of codes can be greatly reduced. A similar process can be carried out by the bit round-down section 15.

However, while the rear side of all code words is rounded down by an optional length at the bit round-down section 15, the system of the embodiment of FIG. 9 enables selection of threshold values by a code block unit for each subband and in accordance with a wavelet decomposition level, and thus it is possible to adjust an image quality and a compression rate minutely, and to obtain a higher image quality by the same amount of codes.

For the image compressed in the above manner, as in the case of the first embodiment, the decoder only decodes the encoded data in accordance with a using scene of image data along the recommendation report, the invention requires no special processes of the decoder, and decoding can be carried out by a general JPEG 2000 decoder.

Figure 10:
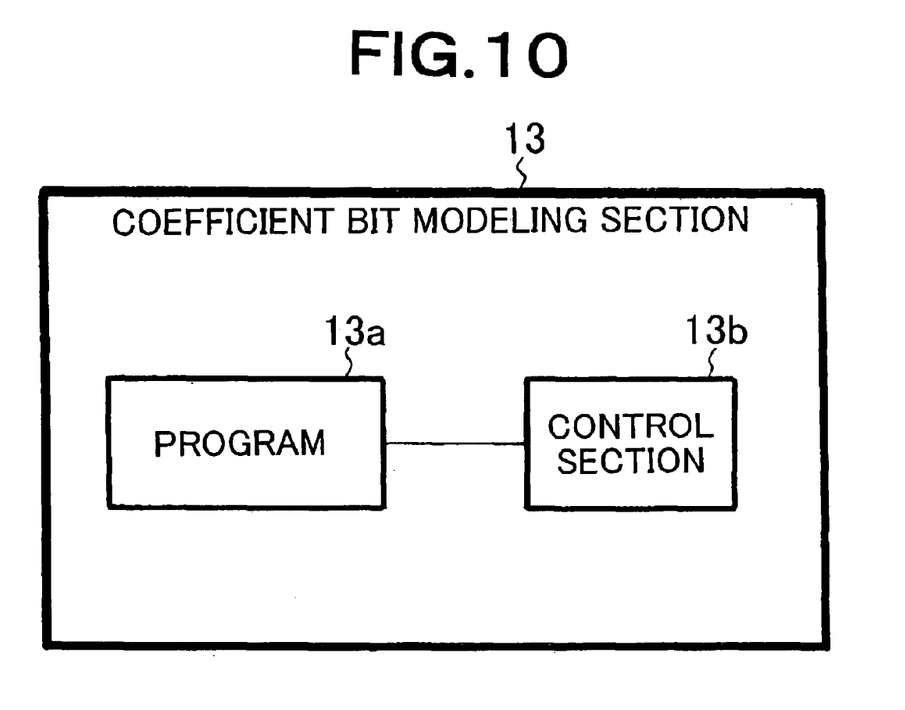
FIG. 10 is a constitutional view of a fourth embodiment.

Next, a fourth embodiment will be described. FIG. 10 is a constitutional view of the fourth embodiment. The fourth embodiment concerns a processing program of a coefficient bit modeling section 13. As shown in the drawing, the coefficient bit modeling section 13 comprises a program 13a for carrying out coefficient bit modeling, and a control section 13b for executing this program. The program 13a is a result of programming the processes shown in the flowcharts of FIGS. 7 to 9.

Thus, according to the present invention, by the foregoing constitution, it is possible to enhance image compression performance while maintaining an image quality.

When coefficient bits are decomposed/aligned in four encoded paths for each context by a procedure called coefficient bit modeling of a JPEG 2000 encoding system, if an appearance frequency of "1" is low in subbit plane coefficients of a clean-up path of a low-order bit plane n (bit plane n is lower in order than bit plane np represented by threshold value np), coefficients of subbit planes of this clean-up path are all reset to "0". Thus, a run length used when a symbol and a context are generated is made longer and, as a result, the amount of codes after arithmetic encoding at a subsequent stage is reduced while an image quality deterioration is suppressed.

Furthermore, a digital image encoding method and a program can provide effects similar to those of the digital image encoding device.

What is claimed is:

1. A digital image encoding device comprising:
   conversion means for converting digital image data into a coefficient based on a spatial frequency;
   quantization means for quantizing the coefficient obtained by said conversion means; and
   coefficient bit modeling means for carrying out coefficient bit modeling by using said coefficient quantized by said quantization means,
   wherein said digital image data is divided into a plurality of subbands in said conversion means,
   wherein said coefficient bit modeling means comprises:
      code block division means for dividing each of said subbands into a plurality of code blocks;
      bit plane decomposition means for decomposing each of coefficients of said code blocks obtained by said code block division means into a plurality of bit planes for each bit weight;
      subbit plane decomposition means for decomposing each of said bit planes obtained by said bit plane decomposition means into a plurality of subbit planes based on usefulness; and
      predetermined data generation means for generating predetermined data in accordance with said subbit planes obtained by said subbit plane decomposition means, and
      requantization means for requantizing a predetermined subbit plane among said subbit planes obtained by said subbit plane decomposition means and passing data after said requantization to said predetermined data generation means.

2. The digital image encoding device according to claim 1, wherein said requantization means carries out said requantization, provided that the following three conditions are satisfied;
   a first condition where a currently processed subband is not a band of a lowest frequency compared with other subbands,
   a second condition where a currently processed bit plane has weight lighter than predetermined weight, and
   a third condition where said number of "1" in a currently processed subbit plane is equal to or lower than a predetermined value.

3. The digital image encoding device according to claim 2, wherein said requantization means resets all currently processed subbit planes to "0", when said three conditions are satisfied.

4. The digital image encoding device according to claim 2, wherein said requantization means resets all currently processed subbit planes and subbit planes lower in order than said subbit planes to "0", when said three conditions are satisfied.

5. The digital image encoding device according to claim 2, wherein said requantization means cancels processing of a currently processed code block and carries out processing of a next code block, when said three conditions are satisfied.

6. The digital image encoding device according to claim 2, wherein said predetermined weight of said second condition and said predetermined value of said number of "1"

7. A digital image encoding means comprises:
conversion step of converting digital image of data into a coefficient based on a spatial frequency;
quantization step of quantizing said coefficient obtained by said conversion step; and
coefficient bit modeling step of carrying out coefficient bit modeling by using said coefficient quantized by said quantization step,
wherein said digital image data is divided into a plurality of subbands in said conversion step,
wherein said coefficient bit modeling step comprises:
code block division step of dividing each of said subbands into a plurality of code blocks;
bit plane decomposition step of decomposing each of coefficients of said code blocks obtained by said code block division means into a plurality of bit planes for each bit weight;
subbit plane decomposition step of decomposing each of said bit planes obtained by said bit plane decomposition step into a plurality of subbit planes based on usefulness; and
predetermined data generation step of generating predetermined data in accordance with said subbit planes obtained by said subbit plane decomposition step, and
requantization step of requantizing a predetermined subbit plane among said subbit planes obtained by said subbit plane decomposition step and passing data after said requantization to said predetermined data generating step.

8. The digital image encoding method according to claim 7, wherein said requantization step carries out said requantization, provided that the following three conditions are satisfied;
a first condition where a currently processed subband is not a band of a lowest frequency compared with other subbands,
a second condition where a currently processed bit plane has weight lighter than predetermined weight, and
a third condition where said number of "1" in a currently processed subbit plane is equal to or lower than a predetermined value.

9. The digital image encoding method according to claim 8, wherein said requantization step resets all currently processed subbit planes to "0", when said three conditions are satisfied.

10. The digital image encoding method according to claim 8, wherein said requantization step resets all currently processed subbit planes and subbit planes lower in order than said subbit planes to "0", when said three conditions are satisfied.

11. The digital image encoding method according to claim 8, wherein said requantization step cancels processing of a currently processed code block and carries out processing of a next code block, when said three conditions are satisfied.

12. The digital image encoding method according to claim 8, wherein said predetermined weight of said second condition and said predetermined value of said number of "1" of said third condition can be selected for every subband and in accordance with a decomposition level of said conversion step.

13. A program for causing a computer to perform a digital image encoding method, said method comprising:
conversion step of converting digital image data into a coefficient based on a spatial frequency;
quantization step of quantizing said coefficient obtained by said conversion step; and
coefficient bit modeling step of carrying out coefficient bit modeling by using said coefficient quantized by said quantization step,
wherein said digital image data is divided into a plurality of subbands in said conversion step,
wherein said coefficient bit modeling step comprises:
code block division step of dividing each of said subbands into a plurality of code blocks;
bit plane decomposition step of decomposing each of coefficients of said code blocks obtained by said code block division means into a plurality of bit planes for each bit weight;
subbit plane decomposition step of decomposing each of said bit planes obtained by said bit plane decomposition step into a plurality of subbit planes based on usefulness; and
predetermined data generation step of generating predetermined data in accordance with said subbit planes obtained by said subbit plane decomposition step, and
requantization step of requantizing a predetermined subbit plane among said subbit planes obtained by said subbit plane decomposition step and passing data after said requantization to said predetermined data generation step.

14. The program according to claim 13, wherein said requantization step carries out said requantization, provided that the following three conditions are satisfied;
a first condition where a currently processed subband is not a band of a lowest frequency compared with other subbands,
a second condition where a currently processed bit plane has weight lighter than predetermined weight, and
a third condition where said number of "1" in a currently processed subbit plane is equal to or lower than a predetermined value.

15. The program according to claim 14, wherein said requantization step resets all currently processed subbit planes to "0", when said three conditions are satisfied.

16. The program according to claim 14, wherein said requantization step resets all currently processed subbit planes and subbit planes lower in order than said subbit planes to "0", when said three conditions are satisfied.

17. The program according to claim 14, wherein said requantization step cancels processing of a currently processed code block and carries out processing of a next code block, when said three conditions are satisfied.

18. The program according to claim 14, wherein said predetermined weight of said second condition and said predetermined value of said number of "1" of said third condition can be selected for every subband and in accordance with a decomposition level of said conversion step.

* * * * *

UNITED STATES PATENT AND TRADEMARK OFFICE
CERTIFICATE OF CORRECTION

PATENT NO. : 6,774,824 B2
DATED : August 10, 2004
INVENTOR(S) : T. Sakaguchi

It is certified that error appears in the above-identified patent and that said Letters Patent is hereby corrected as shown below:

<u>Title page,</u>
Item [56], References Cited, insert the following:

-- OTHER PUBLICATIONS
Dr. Daniel T. Lee, Coding of Still Picture, JPEG 2000 STANDARD,
http://www.jpeg.org/public/fcd/15444-1.pdf, 16 March 2000, Ricoh Silicon Valley, Inc. --

Signed and Sealed this

Seventh Day of December, 2004

JON W. DUDAS
*Director of the United States Patent and Trademark Office*